[122,621]

UNITED STATES PATENT OFFICE.

LOUISA MASTERS, OF JACKSON, MISSISSIPPI.

IMPROVEMENT IN MEDICAL COMPOUNDS OR SALVES.

Specification forming part of Letters Patent No. 122,621, dated January 9, 1872.

Specification describing a new and Improved Healing-Salve, invented by Mrs. LOUISA MASTERS, of Jackson, in the county of Hinds and State of Mississippi.

My invention has for its object to furnish an improved salve for the cure of sores, cuts, bruises, &c., whether they be of long standing or not; and it consists of the salve prepared of the ingredients, in the proportions and manner hereinafter more fully set forth.

In preparing my improved salve, take one-half an ounce of white beeswax, two and a half ounces of rosin, one ounce of sweet oil, one ounce of butter, one ounce of lard, and the white of one egg. These ingredients are warmed and thoroughly mixed. When sufficiently cool the salve may be put into bottles for use or market.

Having thus described my invention, I claim as new and desire to secure by Letters Patent—

An improved salve, prepared of the ingredients and in the proportions and manner substantially as described and set forth.

MRS. LOUISA MASTERS.

Witnesses:
  WM. H. TAYLOR,
  NICHOLAS DANTZ.
(98)